US 6,553,664 B1

(12) United States Patent
Schenk

(10) Patent No.: US 6,553,664 B1
(45) Date of Patent: Apr. 29, 2003

(54) METHOD OF MAKING A SEGMENTED GASKET HAVING A CONTINUOUS SEAL MEMBER

(75) Inventor: Douglas C. Schenk, Chula Vista, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/467,000

(22) Filed: Dec. 17, 1999

(51) Int. Cl.$^7$ ................................................ B23P 15/00
(52) U.S. Cl. ........................................ 29/888.3; 29/460
(58) Field of Search ............................ 29/888.3, 527.1, 29/460, 469; 277/313, 316, 591, 593, 594, 596

(56) References Cited

U.S. PATENT DOCUMENTS

| | | |
|---|---|---|
| 1,986,465 A | 1/1935 | Dempsey |
| 2,722,043 A | 11/1955 | Nenzell |
| 3,738,670 A | 6/1973 | Jelinek et al. |
| 4,293,135 A | 10/1981 | Wallace |
| 4,380,856 A | 4/1983 | Wallace |
| 4,572,522 A | 2/1986 | Smagatz |
| 4,690,413 A | 9/1987 | Adkins |
| 4,719,065 A * | 1/1988 | Gibbon ....................... 29/888.3 |
| 5,149,108 A | 9/1992 | Leiszter |
| 5,149,109 A | 9/1992 | Jelinek et al. |
| 5,161,808 A | 11/1992 | Walters |
| 5,236,203 A | 8/1993 | Uchida et al. |
| 5,428,895 A * | 7/1995 | Sihon ........................ 29/888.3 |
| 5,513,603 A | 5/1996 | Ang et al. |
| 5,536,023 A | 7/1996 | Surbrook et al. |
| 5,618,047 A | 4/1997 | Belter |
| 5,970,612 A * | 10/1999 | West ......................... 29/888.3 |
| 6,241,256 B1 * | 6/2001 | Suggs et al. ................ 29/888.3 |

FOREIGN PATENT DOCUMENTS

FR 2 659 122 9/1991

* cited by examiner

*Primary Examiner*—I Cuda Rosenbaum
(74) *Attorney, Agent, or Firm*—John A. Molnar, Jr.

(57) ABSTRACT

A method of making a gasket of a variety which includes a generally annular retainer member having an inner and outer diametric extent which define a perimeter of a closed geometric shape, and at least one generally annular seal member formed of an elastomeric material and supported on the retainer member to be compressible intermediate a pair of interface surfaces for providing a fluid-tight seal therebetween. At least a first and a second retainer segment each is provided as extending intermediate a first end and a second end, and as having an inner periphery and an outer periphery. To form the retainer member, the first end of each of the retainer segments is connected to the second end of an adjacent segment such that the inner periphery of each segment defines a portion of the inner diametric extent of the retainer member, with the outer periphery of each segment defining a portion of the outer diametric extent of the retainer member. The seal member then is attached to the retainer member so as to formed a continuous ring of elastomeric material which extends along the perimeter of the retainer member.

9 Claims, 8 Drawing Sheets

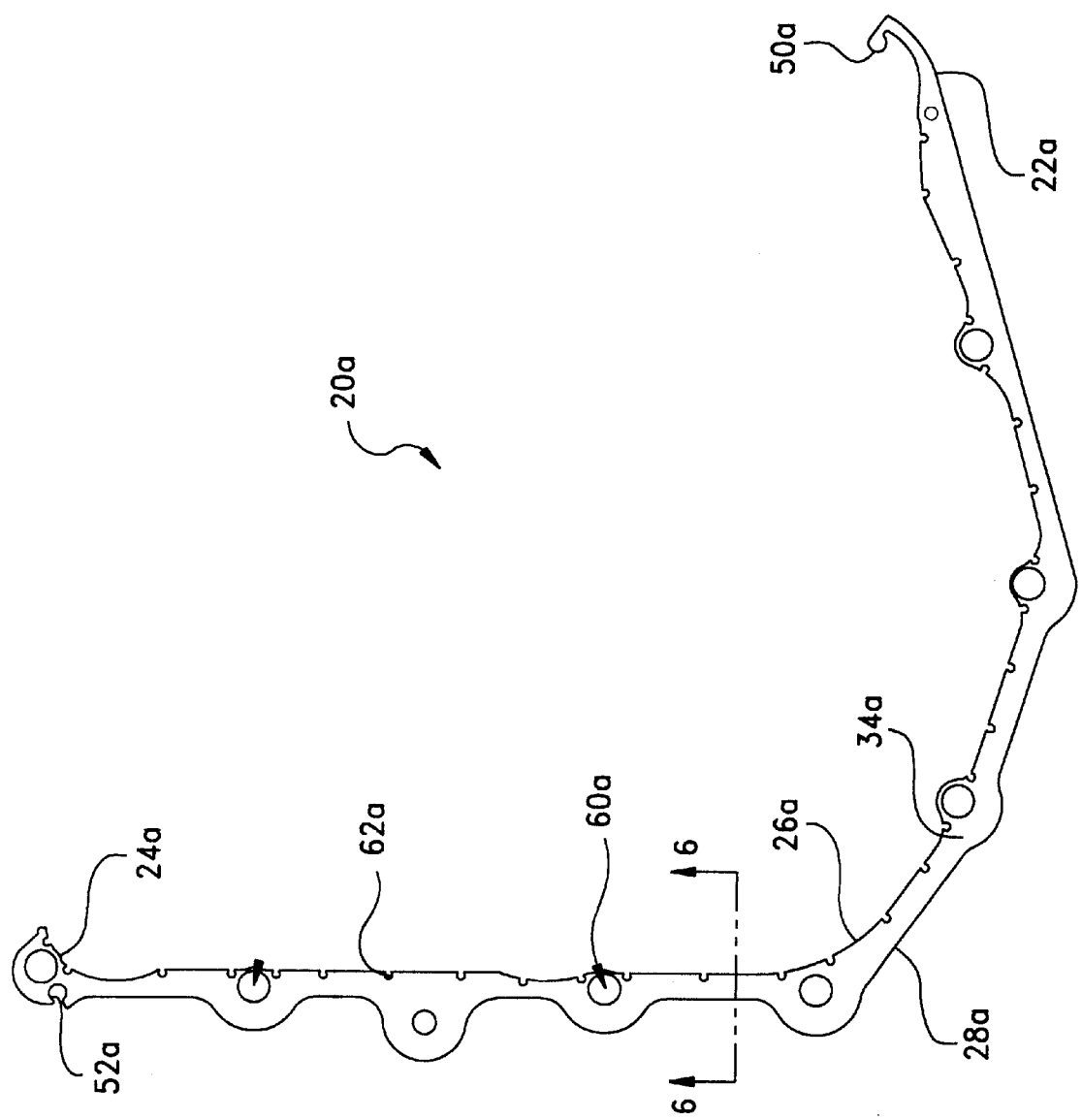

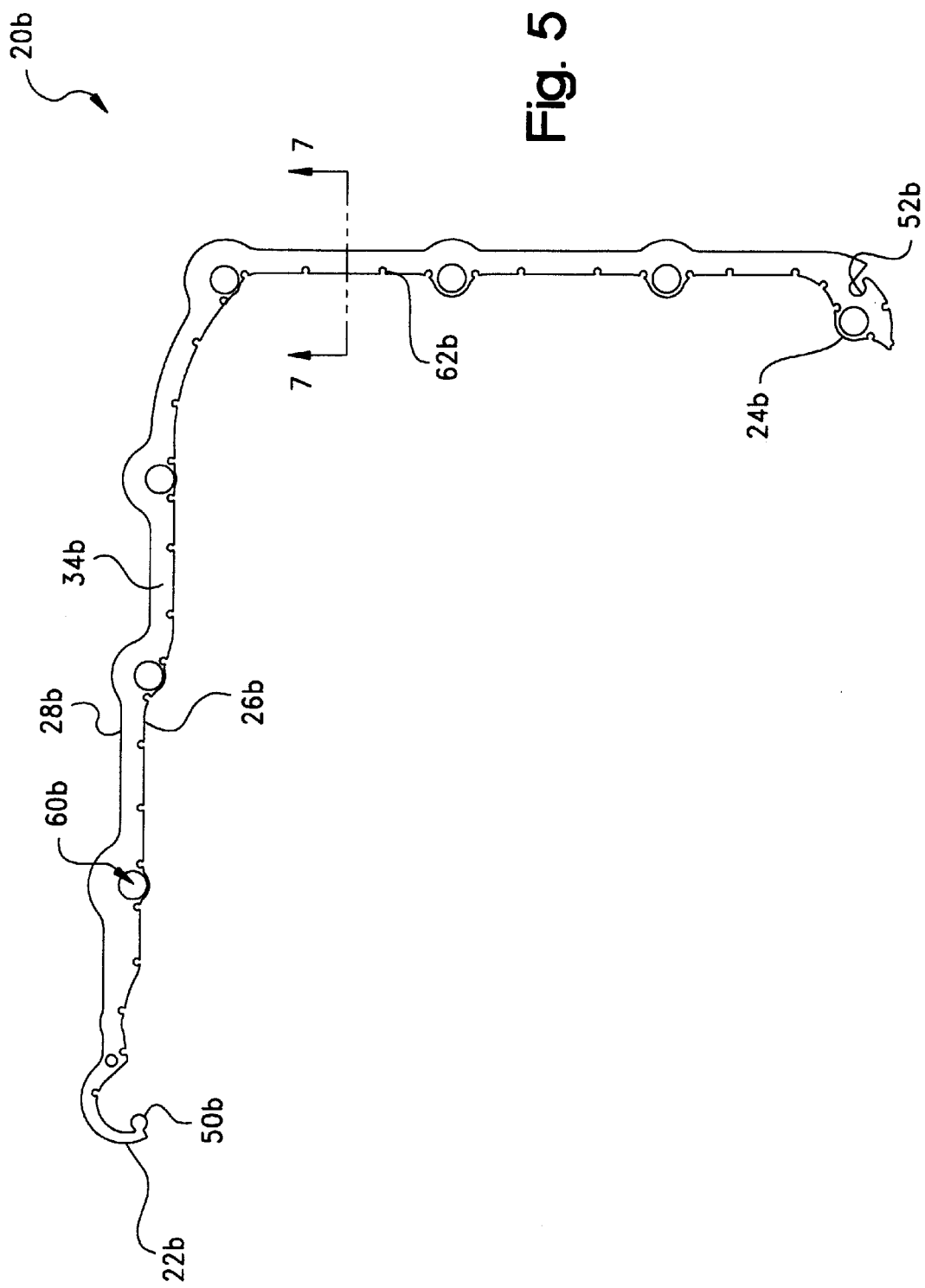

METHOD OF MAKING A SEGMENTED GASKET HAVING A CONTINUOUS SEAL MEMBER

BACKGROUND OF THE INVENTION

The present invention relates broadly to a sealing construction for providing a fluid seal intermediate a pair of opposed, mating parts or structures, and more particularly to a combination metal and elastomer gasket construction adapted to provide a fluid seal on large or a complex interface surface such as between an oil pan and an engine or chassis in a vehicle.

Sealing gaskets of the type herein involved are employed in a variety of commercial and industrial fluid transport applications for compression between the opposing or faying surfaces of a pair of mating parts or structures to provide a fluid-tight interface sealing thereof. In basic construction, such gaskets are typically are formed of a relatively compressible, annular seal member having a central aperture configured for registration with the corresponding margins of the surfaces.

The seal member optionally may be supported by a generally annular metal or plastic retainer. In such an arrangement, the retainer is stamped or molded, with the seal member being molded-in-place in a groove formed into one or both sides of the retainer, or about the inner and/or outer periphery of the retainer to form an integral gasket structure.

In use, the gasket is clamped between the mating surfaces to effect the compression and deformation of the seal member and to develop a fluid-tight interface with each of the surfaces of the pipe flanges. Typically, the compressive force is supplied using a circumferentially spaced-apart arrangement of bolts or other fastening members, each of which is received through an indexed pair of bores formed within the surfaces. Depending upon the geometry of the gasket, the fastening members also may index through corresponding apertures formed within the seal or retainer member of the gasket.

Particularly for gasket constructions involving metal retainers, it is sometimes impractical to fabricate unitary gaskets. In this regard, the layout of the retainer as a single piece unit requires the use of a metal sheetstock having dimensions at least as large as the largest outer diametric extent of the retainer. For retainers which are of a relatively large size or of a complex geometry, a significant portion of the sheetstock in not utilized for the retainer itself but instead is essentially extraneous material. Although, of course, this material may be utilized elsewhere, it generally is preferred from a cost standpoint to use smaller sheetstock sizes if at all possible.

One approach to this problem has been to fabricate the gasket in a plurality of segments or sections, each of which is mechanically or otherwise interlocked with another segment to form the desired geometry. Representative gaskets of such type are described further in U.S. Pat. Nos. 1,986, 465; 2,722,043; 3,738,670; 4,293,135; 4,380,856; 4,572, 522; 4,690,413; 5,149,108; 5,149,109; 5,161,808; 5,236, 203; 5,513,603; and 5,536,023.

Heretofore, individual seal members were molded onto each of the retainer segments. Such construction, however, necessities the provision of a joint between the seal member of each of the segments. Typically, these joints are provided by the abutment of the ends of each seal member with a corresponding end of the member on the adjacent segment. As each of these joints presents a potential leak path, it would be preferred to eliminate them if the application would permit.

In view of the foregoing, it is apparent that improvements in the manufacture of segmented metal and elastomer gaskets would be well-received by industry. A preferred gasket construction would be economical to manufacture, but also would exhibit reliable sealing performance. Such a gasket additionally would be capable of providing fluid sealing with a minimum of compression set and resultant torque loss.

BROAD STATEMENT OF THE INVENTION

The present invention is directed to a method for making a gasket construction of a variety which includes a retainer and an integral sealing element molded-in-place on or otherwise attached to the retainer. The method involves stamping or otherwise fabricating the retainer as a series of individual segments, each of which is mechanically or otherwise interlocked with an adjacent segment to form a retainer assembly which may having a generally closed geometry. A sealing element then is molded in a continuous bead onto the retainer assembly. Advantageously, the fabrication of the retainer in individual segments conserves material and otherwise facilitates its construction. However, by molding the sealing element in a continuous bead onto the assembled retainer, joints within the sealing element are eliminated for more assuredly reliable sealing performance.

It is, therefore, a feature of a disclosed embodiment of the invention to provide a method of making a gasket of a variety which includes a generally annular retainer member having an inner and outer diametric extent which define a perimeter of a closed geometric shape, and at least one generally annular seal member formed of an elastomeric material and supported on the retainer member to be compressible intermediate a pair of interface surfaces for providing a fluid-tight seal therebetween. At least a first and a second retainer segment each is provided as extending intermediate a first end and a second end, and as having an inner periphery and an outer periphery. To form the retainer member, the first end of each of the retainer segments is connected to the second end of an adjacent segment such that the inner periphery of each segment defines a portion of the inner diametric extent of the retainer member, with the outer periphery of each segment defining a portion of the outer diametric extent of the retainer member. The seal member then is attached to the retainer member so formed as a continuous ring of elastomeric material which extends along the perimeter of the retainer member.

Advantages of the present invention include a sealing gasket construction which exhibits reliable sealing properties and torque retention with a minimum of compression set. Additional advantages include a gasket construction which is economical to manufacture, and which may be fabricated in complex shapes and large-size geometries. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein:

FIG. 4 is a plan view of a first segment of the retainer member of FIG. 1;

FIG. 5 is a plan view of a second segment of the retainer member of FIG. 1;

Figure 1:
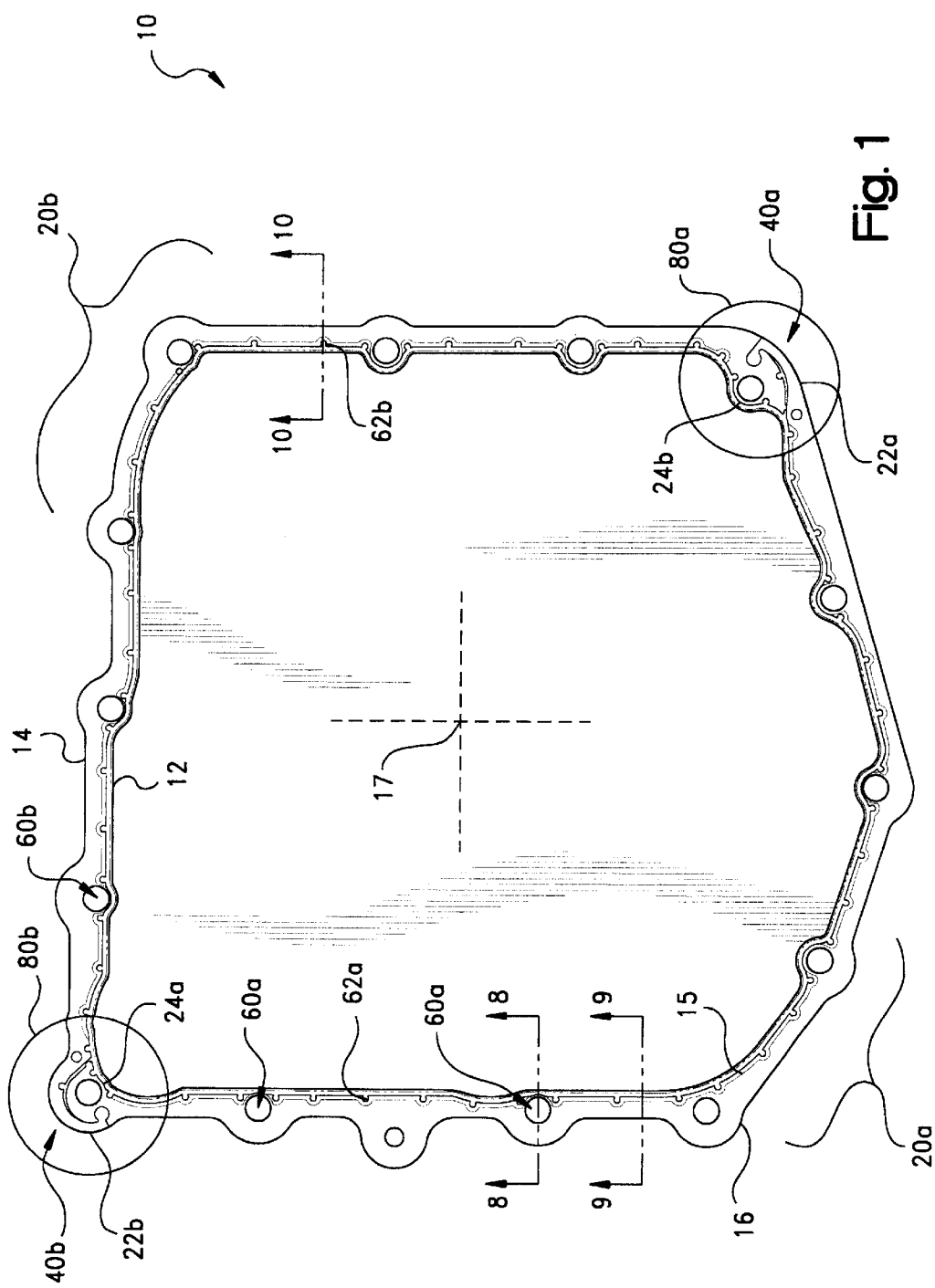
FIG. 1 is a plan view of one embodiment of a gasket according to the present invention which includes a segmented retainer member and a generally continuous seal member which is molded-in-place thereon.

The drawings will be described further in connection with the following Detailed Description of the Invention.

DETAILED DESCRIPTION OF THE INVENTION

Certain terminology may be employed in the description to follow for convenience rather than for any limiting purpose. For example, the terms "forward," "rearward," "right," "left," "upper," and "lower" designate directions in the drawings to which reference is made, with the terms "inward," "inner," or "inboard" and "outward," "outer," or "outboard" referring, respectively, to directions toward and away from the center of the referenced element, and the terms "radial" and "axial" referring, respectively, to directions perpendicular and parallel to the central longitudinal axis of the referenced element. Terminology of similar import other than the words specifically mentioned above likewise is to be considered as being used for purposes of convenience rather than in any limiting sense.

For the illustrative purposes of the discourse to follow, the precepts of the gasket of the present invention are described in connection with the configuration thereof for use as a seal between a transmission pan and the engine or chassis of a vehicle. With the interface surface of these structures registered in confronting opposition, the gasket of the invention may be compressed therebetween by means of a plurality of bolts or other fastening members received through registered pairs of openings spaced circumferentially about the interface surfaces. In view of the discourse to follow, however, it will be appreciated that aspects of the present invention may find utility in other fluid sealing applications requiring a retainer gasket of the type herein involved. Use within those such other applications therefore should be considered to be expressly within the scope of the present invention.

Referring then to the figures wherein corresponding reference characters are used to designate corresponding elements throughout the several views, a representative segmented gasket according to the present invention is shown generally at 10 in FIG. 1 as including at least one generally annular seal member, 12, which is supported on a generally annular and generally planar retainer member, 14, to be compressible intermediate a mating pair of interface surfaces (not shown in FIG. 1) for providing a fluid-tight sealing thereof.

Figure 2:
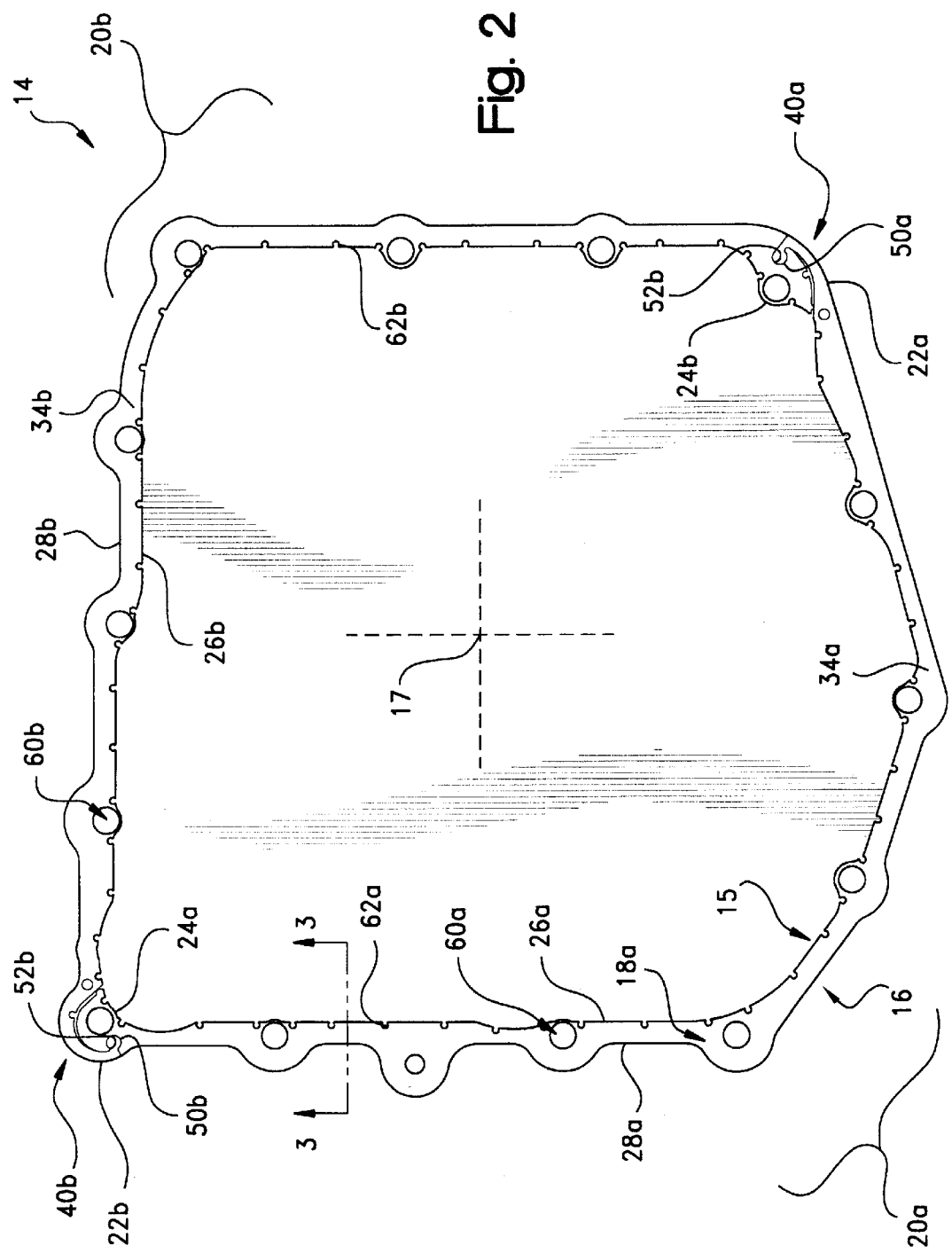
FIG. 2 is a plan view showing the assembly of the retainer member of FIG. 1.
Figure 3:
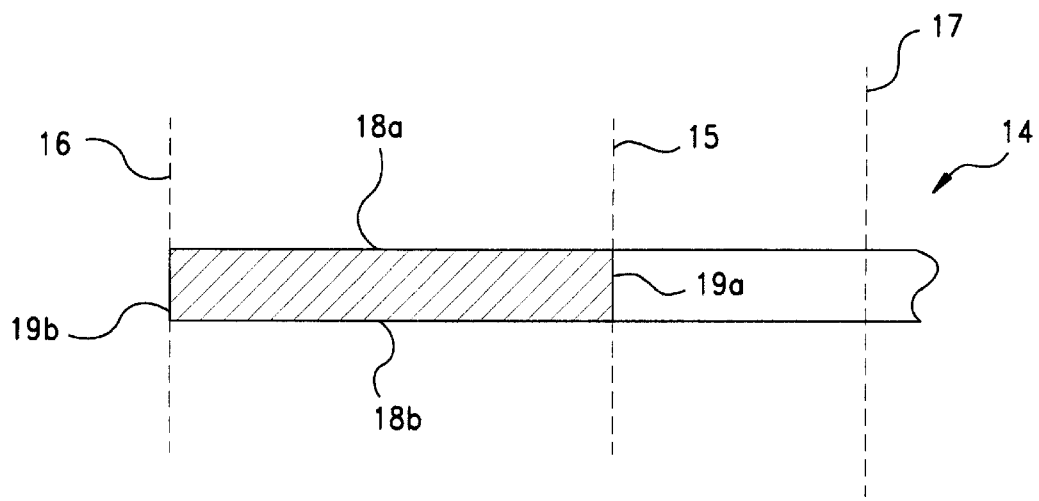
FIG. 3 is a magnified cross-sectional view of the retainer member of FIG. 2 taken through line 3—3 of FIG. 2.

As may be seen best with reference to FIG. 2, retainer member 14 is formed having an inner diametric extent, referenced at 15, and an outer diametric extent, referenced at 16, which together define a closed geometric shape which, in turn, defines the annular perimeter of the retainer member. Although the shape of the perimeter of retainer member 14 is shown for illustrative purposes to be substantially irregular, such shape alternatively may be circular, elliptical, polygonal, or otherwise regular depending upon the intended application. As may be seen with momentary reference to the cross-sectional view of FIG. 3, retainer member 14 further is formed relative to a central longitudinal axis, 17 thereof as having mutually-opposing upper and lower radial surfaces, 18a–b, respectively, which extend generally perpendicular to axis 17 intermediate the inner and the outer periphery 15 and 16 of the retainer member 14, and as having mutually-opposing inner and outer axial surfaces, 19a–b, respectively, which extend generally parallel to axis 17 in defining the corresponding inner or outer diametric extent 15 or 16 of the retainer member.

In accordance with the precepts of the present invention, retainer member 14 is constructed in segments and includes, with reference again to FIG. 2, a first segment, 20a, and a second segment, 20b, although any number of segments 20 may be provided depending upon the diametric extent of retainer member 14 or other considerations. With continued reference to the assembly view of FIG. 2 and with additional reference to FIGS. 4 and 5 wherein segments 20a–b are respectively shown, each segment 20 may be seen to extend intermediate a first end, referenced at 22a in FIG. 3 for segment 20a and at 22b in FIG. 4 for segment 20b, and a second end, referenced at 24a in FIG. 4 for segment 20a and at 24b in FIG. 5 for segment 20b. Each segment 20 also may be seen to have an inner periphery, referenced at 26a in FIG. 4 for segment 20a and at 26b in FIG. 5 for segment 20a, and an opposing outer periphery, referenced at 28a in FIG. 4 for segment 20a and at 28b in FIG. 5 for segment 20b.

Figure 6:
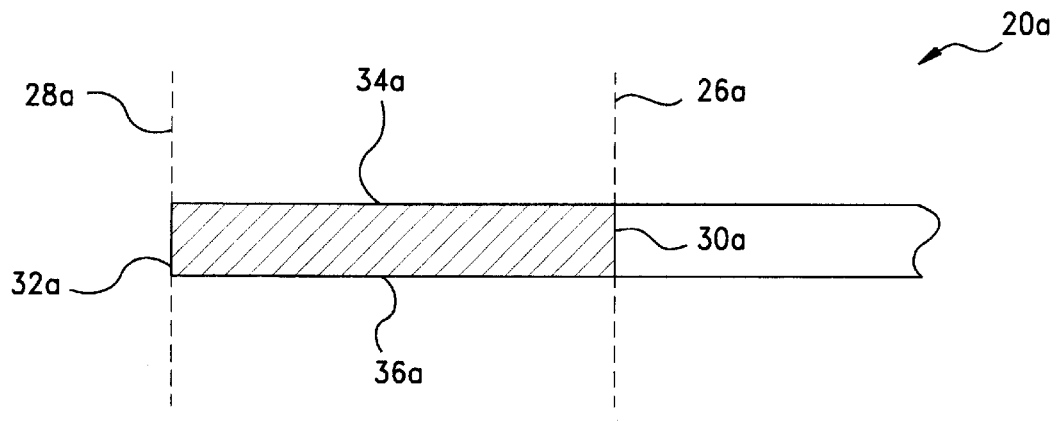
FIG. 6 is a magnified cross-sectional vie w of the first retainer segment of FIG. 4 taken through line 6—6 of FIG. 4.
Figure 7:
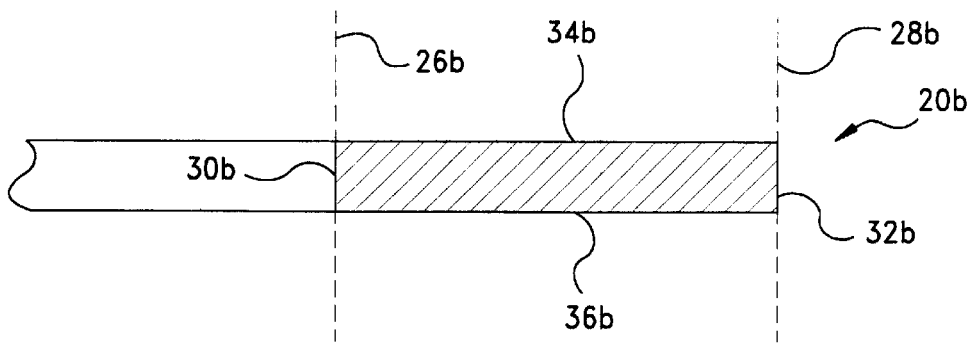
FIG. 7 is a magnified cross-sectional view of the second retainer segment of FIG. 5 taken through line 7—7 of FIG. 5.

With momentary reference to the cross-sectional views of FIGS. 6 and 7, each of the segments 20 further may be seen to have an inner surface, referenced at 30a in FIG. 6 for segment 20a and at 30b in FIG. 7 for segment 20b, which defines the corresponding inner periphery 26a or 26b (shown in phantom) of the segment 20, and an opposing outer surface, referenced at 32a in FIG. 6 for segment 20a and at 32b in FIG. 7 for segment 20b, which defines the corresponding outer periphery 28a or 28b (also shown in phantom) of the segment 20. Each of the segments 20 additionally has an upper surface, referenced at 34a in FIG. 6 for segment 20a and at 34b in FIG. 7 for segment 20b, which extends intermediate the corresponding inner and outer peripheries 26a and 28a, or 26b and 28b, of the segment 20, and a lower surface, referenced at 36a in FIG. 6 for segment 20a and at 36b in FIG. 7 for segment 20b, which also extends intermediate the corresponding inner and outer peripheries 26a and 28a, or 26b and 28b, of the segment 20 as disposed opposite the corresponding upper surface 34a or 34b.

Returning to the assembly view of 2, retainer member 14 may be seen to be formed as having a continuous perimeter by connecting the first end 22 of each of the retainer segments 20 with the second end 24 of the next immediately adjacent segment 20. In this way, the inner periphery 26 of each of the segments 20 defines a portion of the inner diametric extent 15 of the retainer member, with the outer periphery 28 of each of the segments 20 defining a portion of the outer diametric extent 16 of the retainer member.

Specifically with respect to the embodiment shown in FIGS. 2–7, the first end 22a of first segment 20a is connected to the second end 24b of second segment 20b to form a first joint which is referenced at 34a, with the first end 22b of the second segment 20b being connected to second end 24a of first segment 20a to form a second joint which is referenced at 40b. The inner peripheries 26a–b and surfaces 30a–b of the corresponding segments 20a–b thereby each define, respectively, a portion of the inner diametric extent 15 and inner axial surface 19a of the retainer member 14, with the outer peripheries 28a–b and surfaces 32a–b of the corresponding segments 20a–b thereby each defining, respectively, a portion of the outer diametric extent 16 and outer axial surface 19b of the retainer member. Similarly, the upper surfaces 34a–b of the corresponding segments 20a–b thereby each define a portion of the upper radial surface 18a of the retainer member 14, with the lower surfaces 36a–b of the corresponding segments 20-b thereby each defining a portion of the lower radial surface 18b of the retainer member.

Although any number of different interconnections between the ends of segments 20 may be envisioned, the illustrated arrangement involves each of the joints 40 being provided as a mechanical interlocking engagement. In this regard, and as may be seen with additional reference to FIGS. 4 and 5, the first ends 22 of segments 20 each may be mutually configured as having a ball portion which is referenced at 50a in FIG. 4 for segment 20a and at 50b in FIG. 5 for segment 20b, with the second ends 24 each being mutually configured as having a socket portion which is referenced at 52a in FIG. 4 for segment 20a and at 52b in FIG. 5 for segment 20b. Returning to FIG. 2, each of the joints 30 may be seen to be formed via the first end ball portions 50 of each of the segments 20 being received within a corresponding second end socket portion 52 of an adjacent segment 20.

The inner and outer diametric extents 15 and 16 of the retainer member 14 generally are sized such that the gasket 10 (FIG. 1) is receivable intermediate the interface surfaces to be sealed. For the location and alignment of the gasket 10 between those surfaces, retainer member 14 additionally may be provided as shown in FIG. 2 as including a plurality of axial throughbores, one of which is referenced at 60a as formed into segment 20a to extend through the upper and lower surfaces 34a and 34b (FIG. 6) thereof, and another of which is referenced at 60b as formed into segment 20b to extend through the upper and lower surfaces 34b and 36b (FIG. 7) thereof. Throughbores 60 may be spaced-apart along the retainer perimeter and employed for receiving the bolts or other fasteners which are conventionally employed for coupling the interface surfaces under a predetermined torque load. Advantageously, throughbores 60 in conjunction with retainer 14 additionally provide a positive stop delimiting the compression of the gasket in avoiding the over-compression thereof during installation or maintenance.

Retainer member 14 further may be provided as is shown in FIG. 2 as having a series of peripheral notches, one of which is referenced at 62a as formed into the inner surface 30a (FIG. 6), and another of which is referenced at 62b as formed into the inner surface 30b (FIG. 7) of segment 20b, disposed along the inner diametric extent 15 thereof. Notches 62 assist in the development of a mechanical interlocking of the seal member 12 (FIG. 1) to the retainer member 14. Depending upon the area of attachment of seal member 12, the notches 62 alternatively may be disposed along the outer diametric extent 16 of the retainer member 14 as formed into the outer surfaces 32 (FIGS. 6 and 7) of segments 20.

Each of the segments 20 of retainer member 14 may be stamped or molded of a metal or plastic material as two separate components. Suitable metal materials include aluminum, steel, stainless steel, copper, brass, titanium, nickel, and alloys thereof, with low carbon steel being economical and thereby preferred for many applications. The steel may be plated with zinc or otherwise treated for increased corrosion resistance. Depending upon its material of construction and the intended application, retainer member 14 may have an axial thickness of between about $\frac{1}{32}$–$\frac{1}{2}$ inch.

With retainer member 14 being assembled as has been described in connection with FIGS. 2–7, seal member 14 may be molded, bonded, or otherwise attached thereto as a continuous ring, bead, or other annulus of an elastomeric material to complete the construction of gasket 10. In the illustrated configuration of FIG. 1, and as may be seen in the cross-sectional views of FIGS. 8–10, seal member 14 has an outboard side, 66, and an opposing inboard side, 68, which defines the inner periphery of the gasket 10. The outboard side 66 of the seal member 12 is attached to each of the inner surfaces 30a (FIGS. 8–9) and 30b (FIG. 10) of segments 20a–b such that the seal extends continuously about the inner axial surface 19a of the assembled retainer member 14. Advantageously, and as may be seen best in FIG. 10, the seal member 12 is secured within each of the notches 62 to effect a mechanical interlocking with the retainer member 14.

Figure 8:
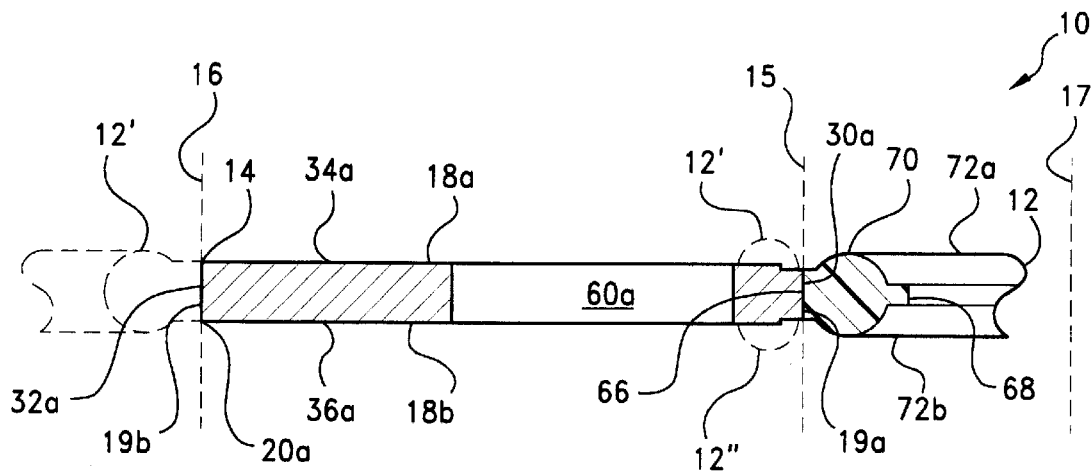
FIG. 8 is a magnified cross-sectional view of gasket of FIG. 1 taken through line 8—8 of FIG. 1.
Figure 9:
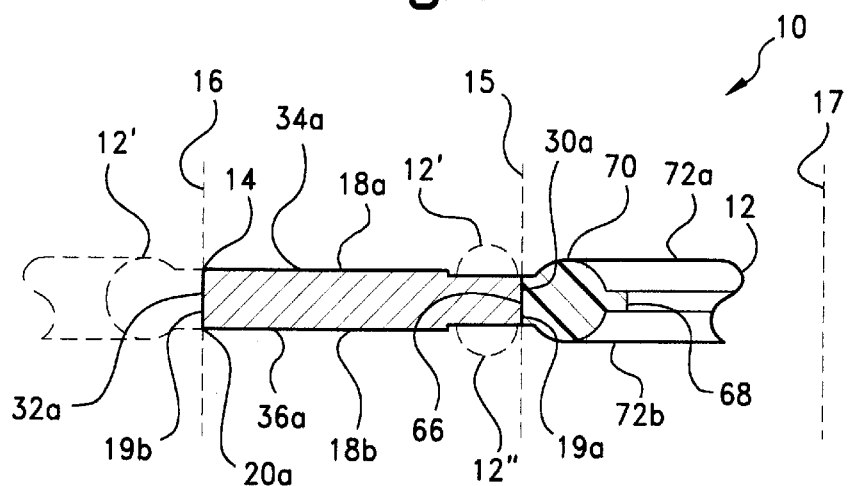
FIG. 9 is a magnified cross-sectional view of gasket of FIG. 1 taken through line 9—9 of FIG. 1.
Figure 10:
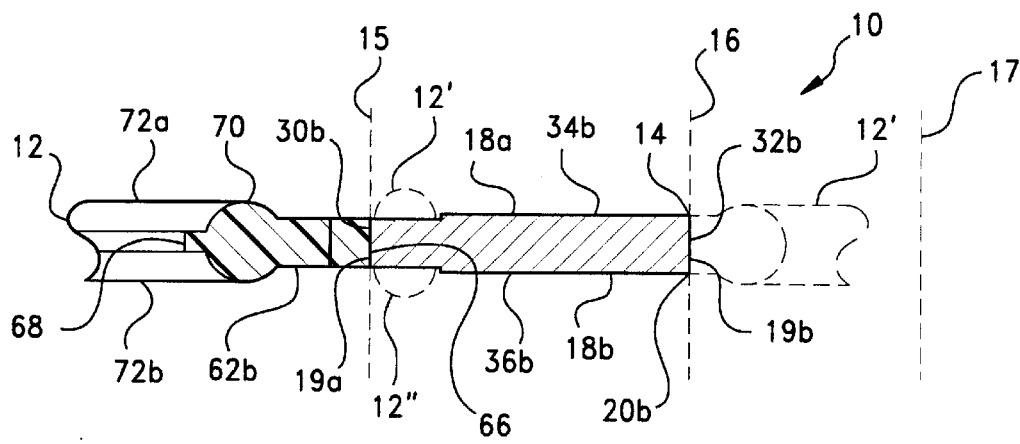
FIG. 10 is a magnified cross-sectional view of gasket of FIG. 1 taken through line 10—10 of FIG. 1.

In an exemplary alternatively configuration, seal member 14 may be molded, bonded, or otherwise attached as is shown in phantom at 12' in FIGS. 8–10 to each of the outer surfaces 32a (FIGS. 8–9) and 32b (FIG. 10) of segments 20a–b to extend continuously about the outer axial surface 19b of the assembled retainer member 14. Also, and as is shown in phantom at 12" and 12'", seal member 12 also may be attached to one or both the upper and lower surfaces 34a–b and 36a–b surfaces of segments 20a–b either directly thereon or as interference fit, adhesively bonded, or molded within a mounting groove which is machined or otherwise recessed into the surfaces 34 and 36.

For the axial compression of seal member 12 between the mating interface surfaces of the intended application, the bead portion, referenced at 70 in the cross-sectional views of FIGS. 8–10, of the seal member 12 may be provided, depending upon the geometry of the interface surfaces to extend beyond the corresponding radial surfaces 18 of retainer member 14. That is, seal member 12 may be provided to have a nominal axial cross-sectional thickness that is from about 1–100 mils more than the nominal axial thickness of retainer member 14. Bead 70 may be shaped, as is shown, to have a generally circular cross-sectional geometry, but alternatively may be configured as being elliptical, polygonal, or lobe or otherwise shaped: Bead portion 70 may be of any radial size, but typically will be between about 0.030–0.125 inch for most applications.

With continued referenced to FIGS. 8–10, as.attached to retainer member 14, the bead portion 70 of seal member 12 presents oppositely disposed, generally hemispherical bearing surfaces, 72a–b, which define upper and lower sealing surfaces of the gasket 10. Seal member 12 is shown in FIG. 1 to extend about the periphery of retainer member 14 for generally coaxial registration with the margins of the interface faces of the application, although it will be appreciated that different geometries of gasket 10 may be envisioned depending upon the configuration of the corresponding interface surfaces of the intended application.

In the manufacture of gasket 10, the corresponding axial or radial surface 18 and/or 19 of the assembled retainer member may be primed with a bonding agent to assist in the chemical bonding of the seal member 12 thereto. The primed retainer 14 then may be placed into a heated molded cavity for the injection, compression, or transfer molding of an uncured rubber compound forming the seal members 12. Each of the elastomeric seal members 12 thereby may be formed and cured-in-place as vulcanized directly onto retainer member 12. The mold flash which is shown on the inboard side 68 of seal member 14 in the cross-sectional views of FIGS. 8–10 need not be removed as having no effect on the sealing performance of the gasket 10. Alternatively, the elastomeric elements may be molded in a separate operation and bonded to retainer member 14 using an adhesive or the like.

Figure 11:
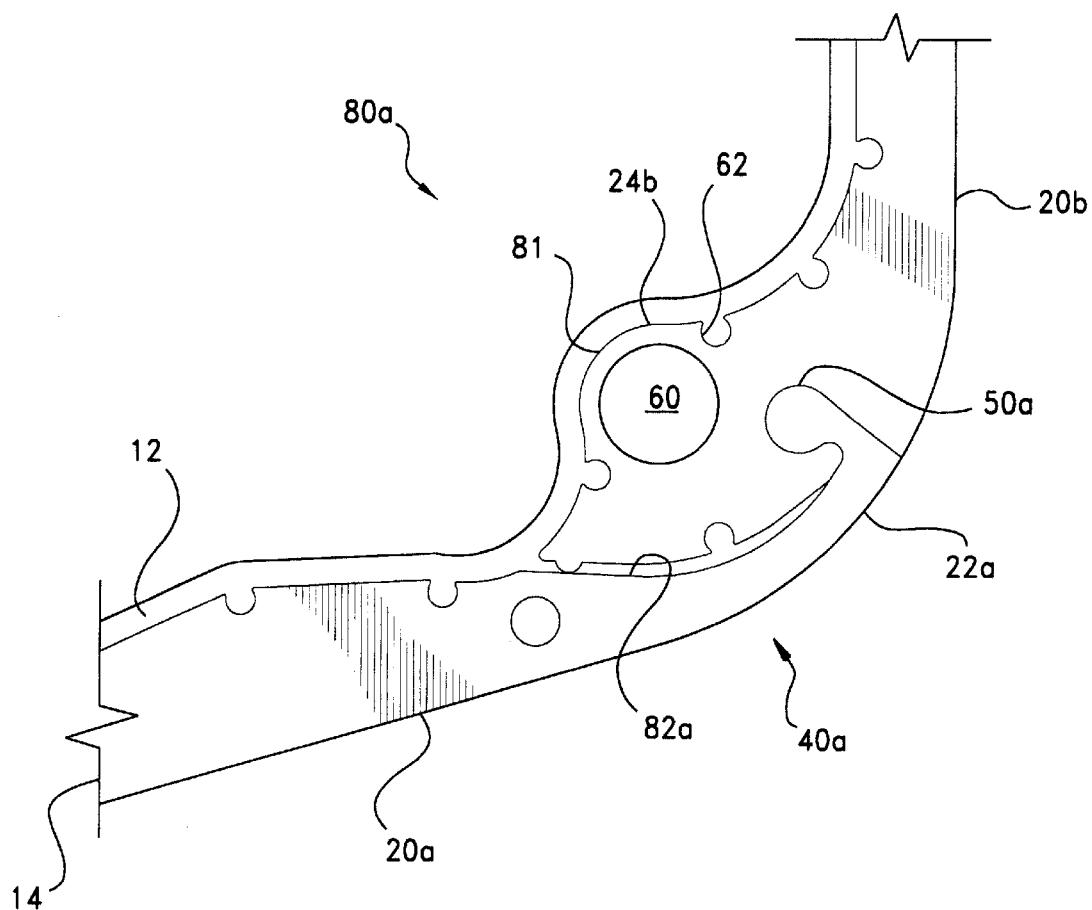
FIG. 11 is a magnified view of the gasket of FIG. 1 showing a first joint thereof in enhanced detail.
Figure 12:
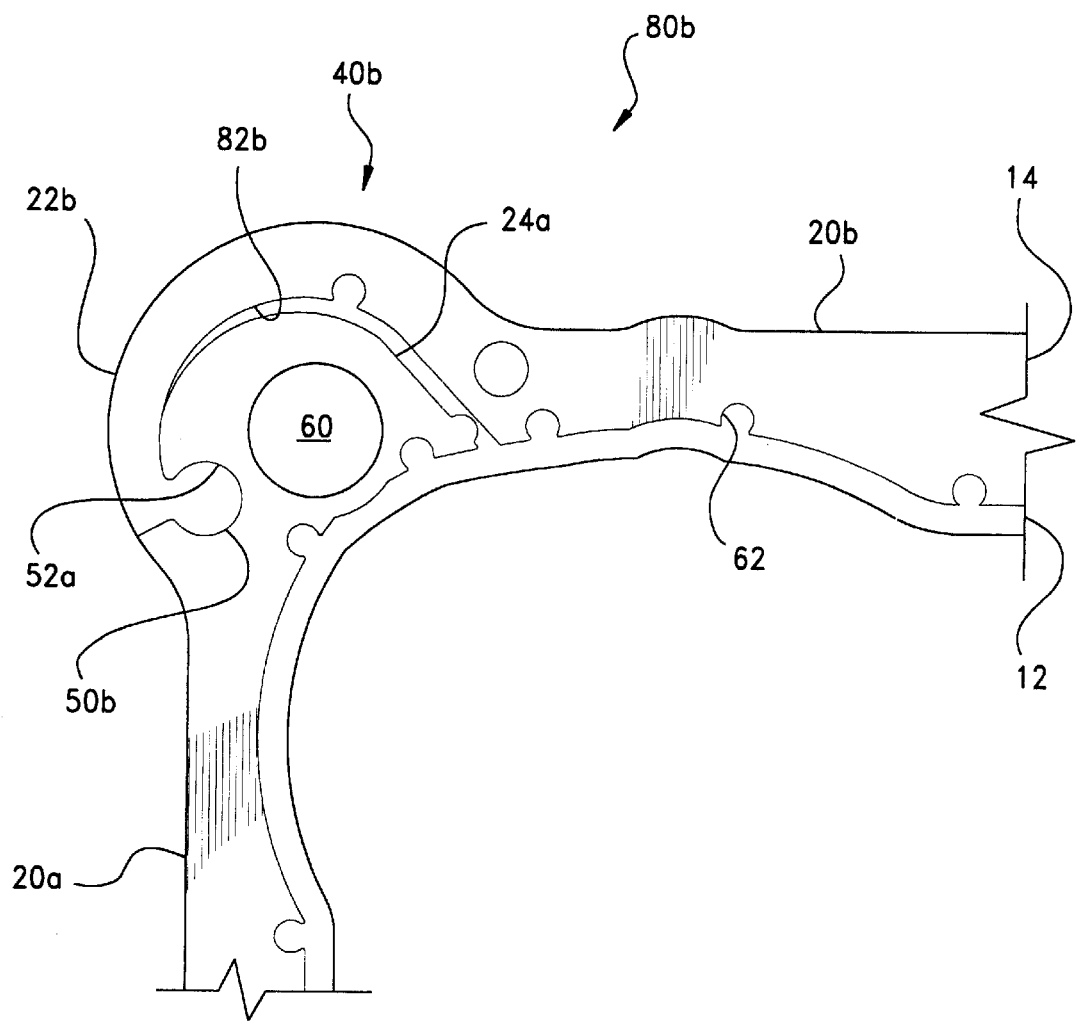
FIG. 12 is another magnified view of the gasket of FIG. 1 showing a second joint thereon in enhanced detail.

Advantageously, and as may be seen best in the magnified views of FIGS. 11 and 12 wherein the retainer joints 40a–b reappear at 80a–b, respectively, the molding or other attachment of seal member 12 in a continuous ring about the periphery of the retainer member seals both the joints 40a–b and the throughbores 60. That is, the seal member 12 extends continuously across the joints 40 and along a portion, referenced at 81, of the outer perimeter of the bores 60. Additionally with respect to the molding of seal member 12, any gaps in the joints, as at 82a–b, may be filled during the molding process with the elastomeric material of the seal member to provided an additional bond between the retainer segments 20a–b.

Seal member 12 preferably is formed of a rubber or other elastomeric material, but specifically as selected for high temperature performance or otherwise for compatibility with any fluid being handled. Suitable materials include natural rubbers such as Hevea, as well as thermoplastic, i.e., melt-processible, or thermosetting, i.e., vulcanizable, synthetic rubbers such as fluoropolymers, chlorosulfonate, polybutadiene, SBR, polybutadiene, buna-N, butyl, neoprene, nitrile, polyisoprene, silicone, fluorosilicone, copolymer rubbers such as ethylene-propylene (EPR), ethylene-propylene-diene monomer (EPDM), nitrile-butadiene (NBR) and styrene-butadiene (SBR), or blends such as ethylene or propylene-EPDM, EPR, or NBR. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides. As used herein, the term "elastomeric" is ascribed its conventional meaning of exhibiting rubber-like properties of compliancy, resiliency or compression deflection, low compression set, flexibility, and an ability to recover after deformation, i.e., stress relaxation.

Advantageously, seal member 12 exhibits a reduced yield stress as compared to the metal or plastic retainer member 14 and, accordingly, is thereby deformable for conforming to any irregularities between the interface surfaces of the structures being sealed. As a given compressive load is applied by the tightening of the bolts which may be used to fasten those interface surfaces, an increased bearing stress is provided about along the margins thereof by virtue of the reduced surface area contact of the bearing surfaces 72 (FIGS. 8–10) of the seal members on the interface surfaces. This increased stress will be sufficient to exceed the reduced yield stress of the seal member for the deformation thereof effecting the fluid-tight sealing of the interfacing surfaces.

In use, seal member 12 advantageously facilitates the installation and replacement of the gasket 10 in accommodating for tolerances or other minor differences in the torque load of the bolts or other fastening members conventionally employed to join the interfacing surface of the application. That is, by virtue of the resiliency of elastomeric member 12, the fluid integrity of the gasket 10 may be maintained to some degree even if the joint spacing between the interface surface is less than exactly uniform.

Moreover, the combination of a relatively incompressible retainer member 14 and a relatively compressible seal member 12 further provides a gasket construction which minimizes torque loss and thereby obviates much of the need for the periodic retorquing of the fastening members used to secure the interfacing surfaces. That is, it is well-known that gaskets of the type herein involved may develop a compression set which is manifested by fluid leaks as the tension in the bolts is relaxed and the fluid-tight sealing of the interfacing surfaces is compromised. In this regard, the provision of seal member 12 ensures positive sealing, with retainer member 14, in turn, synergistically providing generally non-yielding contact in establishing an alternative load torque path minimizing the compression set and leak potential of the gasket 10. In the case of a metal retainer 14, such contact additionally affords improved heat transfer between the interface surfaces, and also develops relatively high seal stresses for assured fluid-tight sealing of the interfacing structures.

Thus, a unique segmented gasket construction for oil pans and other applications is described which exhibits reliable sealing properties and torque retention with a minimum of compression set. Additional advantages include a gasket construction which is economical to manufacture even in complex shapes and large-size geometries.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

What is claimed is:

1. A method of making a sealing gasket of a variety which includes a generaliy annular retainer member having an inner and outer diametric extent which define a perimeter of a closed geometric shape, and at least one compressible seal member formed of an elastomeric material which is supported on the retainer member, said method comprising the steps of:

(a) providing at least a first and a second retainer segment, each said retainer segment extending intermediate a first end and a second end, and having an inner periphery and an outer periphery;

(b) connecting the first end of each said retainer segment of step (a) to the second end of an adjacent said retainer segment to form said retainer member, the inner periphery of each said segment defining a portion of the inner diametric extent of said retainer member, and the outer periphery of each said segment defining a portion of the outer diametric extent of said retainer member; and (c) attaching said at least one seal member to said retainer member of step (b) as a continuous ring of said elastomeric material which extends along the perimeter of said retainer member.

2. The method of claim 1 wherein:

each said retainer segment is provided in step (a) as having an inner surface which defines the inner periphery thereof, and an outer surface which defines the outer periphery thereof;

said retainer member is formed in step (b) as having an inner axial surface which defines the inner diametric extent of said retainer member, and an outer axial surface which defines the outer diametric extent of said retainer member, the inner surface of each of the retainer segments of step (a) defining a portion of the inner axial surface of said retainer member, and the outer surface of each of the retainer segments of step (a) defining a portion of the outer axial surface of said retainer member; and said seal member is attached to said retainer member in step (c) by being molded in place on the inner surface of each said retainer segment to extend continuously about the inner axial surface of said retainer member.

3. The method of claim 1 wherein:

each said retainer segment is provided in step (a) as having an inner surface which defines the inner periphery thereof, and an outer surface which defines the outer periphery thereof;

said retainer member is formed in step (b) as having an inner axial surface which defines the inner diametric extent of said retainer member, and an outer axial surface which defines the outer diametric extent of said retainer member, the inner surface of each of the retainer segments of step (a) defining a portion of the inner axial surface of said retainer member, and the outer surface of each of the retainer segments of step (a) defining a portion of the outer axial surface of said retainer member; and said seal member is attached to said retainer member in step (c) by being molded in place on the outer surface of each said retainer segment to extend continuously about the outer axial surface of said retainer member.

4. The method of claim 1 wherein:

each said retainer segment is provided in step (a) as having an upper surface extending intermediate the inner and the outer periphery thereof, and a lower surface disposed opposite the upper surface and extending intermediate the inner and the outer periphery of said retainer segment;

said retainer member is formed in step (b) as having an upper radial surface which extends intermediate the inner and outer diametric extent of said retainer member, and a lower radial surface disposed opposite of the upper radial surface and which extends intermediate the inner and outer diametric extent of said retainer member, the upper surface of each of the retainer segments of step (a) defining a portion of the upper radial surface-of said retainer member, and the lower surface of each of the retainer segments of step (a) defining a portion of the lower radial surface of said retainer member; and said seal member is attached to said retainer member in step (c) by being molded in place on the upper surface of each said retainer segment to extend continuously about the upper radial surface of said retainer member.

5. The method of claim 1 wherein:

each said retainer segment is provided in step (a) as having an upper surface extending intermediate the inner and the outer periphery thereof, and a lower surface disposed opposite the upper surface and extending intermediate the inner and the outer periphery of said retainer segment;

said retainer member is formed in step (b) as having an upper radial surface which extends intermediate the inner and outer diametric extent of said retainer member, and a lower radial surface disposed opposite of the upper radial surface and which extends intermediate the inner and outer diametric extent of said retainer member, the upper surface of each of the retainer segments of step (a) defining a portion of the upper radial surface of said retainer member, and the lower surface of each of the retainer segments of step (a) defining a portion of the lower radial surface of said retainer member; and said seal member is attached to said retainer member in step (c) by being molded in place on the lower surface of each said retainer segment to extend continuously about the lower radial surface of said retainer member.

6. The method of claim 1 wherein said retainer member is formed of a metal material selected from the group consisting of aluminum, steel, stainless steel, copper, brass, titanium, nickel, and alloys thereof.

7. The method of claim 1 wherein said seal member is formed of a natural or synthetic rubber.

8. The method of claim 1 wherein:

the first end of each said retainer segment of step (a) is configured to be interlocked with the corresponding second end of said adjacent said retainer segment of step (b); and the first end of each said retainer segment is interlocked in step (b) to the second end of said adjacent said retainer segment.

9. The method of claim 8 wherein:

the first end of each said retainer segment of step (a) is configured as a ball portion and the second end of each said retainer segment of step (a) is configured as a socket portion; and the ball portion of each said retainer segment is received in step (b) in the socket portion of said adjacent said retainer segment.

* * * * *